(12) United States Patent
Vaughn

(10) Patent No.: US 6,260,546 B1
(45) Date of Patent: Jul. 17, 2001

(54) DIRECT NITROUS INJECTION SYSTEM OPERABLE FROM ZERO TO 100% THROTTLE CONTROL

(76) Inventor: E. Lanny Vaughn, 4334 Heights Ave., Pittsburg, CA (US) 94565

( * ) Notice: Subject to any disclaimer, the term of this patent is extended or adjusted under 35 U.S.C. 154(b) by 0 days.

(21) Appl. No.: 09/552,865

(22) Filed: Apr. 20, 2000

Related U.S. Application Data

(60) Provisional application No. 60/130,421, filed on Apr. 21, 1999.

(51) Int. Cl.$^7$ .................................................... F15B 7/08
(52) U.S. Cl. ........................................... 123/585; 123/297
(58) Field of Search ................................. 123/294, 297, 123/445, 531, 585, 590, 298, 305

(56) References Cited

U.S. PATENT DOCUMENTS

| | | | |
|---|---|---|---|
| 2,034,855 | * 3/1936 | Alby | 123/297 |
| 4,448,160 | * 5/1984 | Vosper | 123/297 |
| 5,890,476 | * 4/1999 | Grant | 123/585 |
| 6,032,640 | * 3/2000 | Evans | 123/297 |

FOREIGN PATENT DOCUMENTS 2-64243 * 3/1990 (JP).

* cited by examiner

Primary Examiner—Noah P. Kamen
(74) Attorney, Agent, or Firm—Bruce H. Johnsonbaugh

(57) ABSTRACT

A supplemental nitrous oxide and fuel injection system for use with an internal combustion engine, which includes the unique properties of variable flow-rate control of the supplemental injection system and direct cylinder injection methods. Where an engine is normally controlled by the driver with the (0–100%) throttle control of the existing air/fuel system, this supplemental nitrous oxide and fuel injection system is linked to the existing throttle control and controlled in the same manner. In addition, this system also provides a direct cylinder injection method that completely bypasses the existing intake manifold and carburetor/fuel injection.

8 Claims, 5 Drawing Sheets

DIRECT NITROUS INJECTION SYSTEM OPERABLE FROM ZERO TO 100% THROTTLE CONTROL

CROSS-REFERENCE TO RELATED APPLICATION

This application claims the benefit of U.S. provisional application Ser. No. 60/130,421, filed Apr. 21, 1999.

BACKGROUND AND SUMMARY OF INVENTION

The present invention relates generally to a supplemental, on demand, nitrous oxide injection system especially well-suited for racing vehicles such as motorcycles, automobiles and watercraft. The present invention provides a supplemental nitrous oxide injection system capable of smooth and safe operation throughout the entire throttle range of virtually any internal combustion engine.

Nitrous oxide injection systems are known in the prior art. For example, Nitrous Oxide Systems, Inc. of Costa Mesa, Calif. provides a nitrous oxide injection system for motorcycles. This prior art system is shown schematically in FIG. 5 of this application. This particular prior art system only allows the entry of nitrous oxide when the vehicle is at, or above, 50% of wide open throttle ("WOT"). The present invention provides an injection system capable of safe and efficient operation from zero to 100% of wide open throttle.

The prior art includes the Grant U.S. Pat. No. 5,839,418 dated Nov. 24, 1998. This patent provides a fuel supply module positioned between the carburetor and intake manifold through which fuel and nitrous oxide are sprayed. The nitrous oxide and fuel thereafter mix in the intake manifold. However, the primary drawback of that system is that the nitrous oxide is introduced unevenly to the plurality of cylinders in the engine. Those cylinders that receive a higher proportion of nitrous oxide typically run hotter than the other cylinders, resulting in excessive wear caused by the heat. Another disadvantage of systems injecting the nitrous oxide into the intake manifold is that the pressurized nitrous oxide may accumulate in the intake manifold through leaky control valves. Such unwanted accumulations of nitrous oxide in the intake manifold can cause explosions when the engine is started.

The Norcia et al U.S. Pat. No. 4,683,843 dated Aug. 4, 1987 teaches an earlier system for injecting nitrous oxide through a plate mounted between the carburetor and intake manifold. This system has the inherent drawbacks described above with respect to the Grant U.S. Pat. No. 5,839,418.

The Wheatley U.S. Pat. No. 4,494,488 dated Jan. 22, 1985 also teaches a nitrous oxide injection system where the nitrous oxide is introduced through a plate between the carburetor and intake manifold. That patent is primarily concerned with prolonging the initial momentary burst of nitrous oxide into the fuel system upon activation of the nitrous oxide injection system.

The existing fogger (or mixer) nozzle technology that is used in the present invention is part of the prior art as shown in U.S. Pat. Nos. 4,827,888 and 5,699,776.

The present invention provides a supplemental nitrous oxide injection system wherein a proper ratio of nitrous oxide to fuel is throttle controlled, and is preferably proportional to, zero to 100% of wide open throttle (W.T.). The present invention provides a steady and proportional flow of nitrous oxide which avoids the difficulty of the prior art systems in dealing with the initial momentary burst of nitrous oxide and the ensuing relatively uneven supply of nitrous oxide relative to fuel, especially when the nitrous oxide is first introduced into the fuel system. This variable flow control design allows the driver of the vehicle to use the normal throttle control for the engine to also control the flow rate of the nitrous-oxide injection system.

The present invention also provides a unique and novel method of introducing the supplemental nitrous oxide and fuel directly into each combustion chamber of the engine rather than into the region between the carburetor and intake manifold. The present invention thereby avoids the uneven distribution of nitrous oxide to multiple cylinders of an engine. The present invention provides a uniform flow of nitrous oxide to each cylinder, equalizing the fuel mixture ratio in each cylinder and minimizing those instances of the cylinders running hot and causing engine damage.

The present invention also provides a relatively safe system for nitrous oxide injection in that the nitrous oxide bypasses the carburetor and intake manifold and therefore is unable to accumulate in the engine intake manifold through a leaky solenoid. Also, the possibility of low fuel pressure causing the fuel mixture to "lean out" to the point of causing engine damage is reduced by interlocking the "arming" of the system with the presence of adequate fuel pressure.

DESCRIPTION OF THE DRAWINGS

Figure 1:
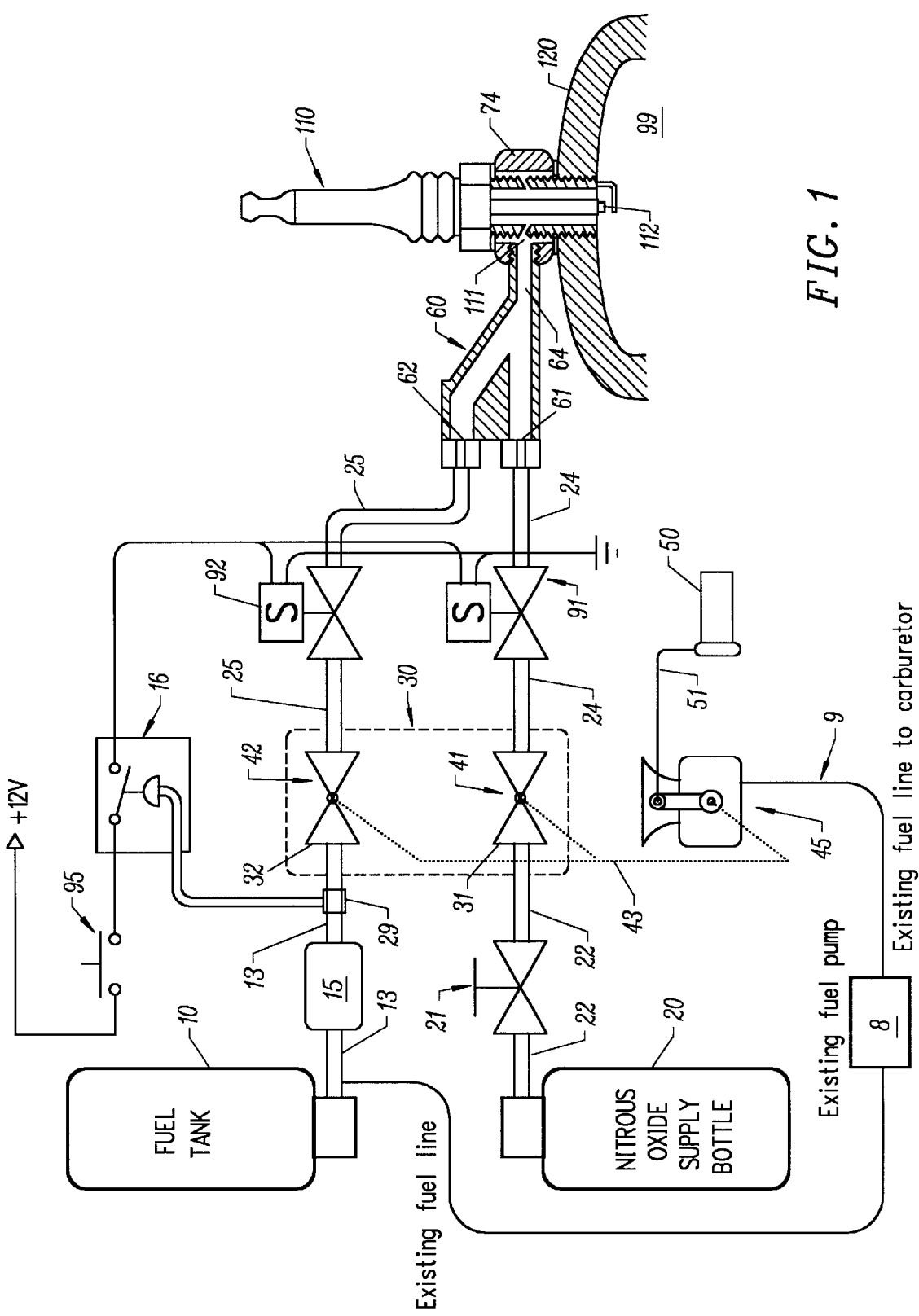
FIG. 1 is a schematic representation of a first embodiment of the invention utilizing a mechanical linkage to connect the supplemental nitrous oxide and fuel metering valves to the existing primary fuel system control (carburetor or fuel-injection-system throttle body) and also shows the direct cylinder injection apparatus.

The preferred embodiment of the present invention is illustrated schematically in FIG. 1. A pressurized nitrous oxide container 20 is mounted, for example, adjacent a motorcycle engine so that control valve 21 is readily accessible to the driver. A nitrous oxide supply line 22 extends from container 20 through control valve 21 to a first input port 31 of throttle body 30. A gasoline supply line 13 extends from the vehicle's fuel tank 10 to the inlet of the required supplemental fuel pump 15. From the outlet of the fuel pump 15, fuel line 13 extends to the fuel inlet port 32 of throttle body 30. In addition, a "tee" 29 in fuel line 23 provides a pressure tap connection to the normally open fuel pressure switch 16. The nitrous oxide supply line 22 and the fuel supply line 13 are both supplemental to the standard primary fuel line 9 and fuel pump 8 which deliver primary fuel to the carburetor and through the intake manifold to the cylinders, through intake valves (not shown for clarity).

Throttle body 30 includes a pair of metering valves 41 and 42 (or metering means) which control the flow (zero to 100%) through lines 22 and 13, and through the throttle body of supplemental nitrous oxide and gasoline, respectively. Actuation of metering valves 41 and 42 in the embodiment of FIG. 1 is accomplished by the mechanical linkage 43 (shown in phantom) that extends to the throttle shaft of the existing carburetor/throttle body 45 of the engine. The existing throttle control 50 (right twist grip for motorcycles, foot accelerator pedal for autos, etc.) for the vehicle is connected to the throttle shaft of 45 by throttle cable 51. Thus, when the driver opens the throttle of the carburetor/throttle body 45, linkage 43 also opens the nitrous injection system's metering valve 41 and the fuel metering valve 42.

The metered nitrous oxide exits the throttle body by way of the nitrous delivery line 24, passing through the control solenoid valve 91 and into the fogger (mixer) nozzle assembly 60. Similarly, the metered supplemental fuel exits the throttle body by way of the fuel delivery line 25, passing through the fuel control solenoid valve 92 and into the fogger nozzle assembly 60. The control solenoid valves are electrically actuated by a normally open switch 95 and the normally open electrical contacts of the fuel pressure switch 16.

The nitrous oxide metering jet 61, and the fuel metering jet 62, are in the inlet connections of the fogger nozzle assembly 60 and determine the maximum (100%) amount of nitrous oxide and supplemental fuel, respectively, to be injected. The supplemental fuel is atomized and combined with the nitrous oxide in the fogger nozzle assembly 60 and then flows through the nozzle outlet 64 to the spark plug injection adapter (SPIA, design #1) 74. The SPIA#1 74 has an annulus or channel on its inner diameter to allow the supplemental nitrous oxide and fuel mixture to flow around the threads of the spark plug 110. Two holes 111 are drilled through the spark plug to allow the mixture to flow from SPIA#1 74, through the two holes 111, and directly into the combustion chamber 99 of a cylinder at a point adjacent the firing tip 112 of spark plug 110, bypassing intake manifolds and carburetors. The relatively high pressure of the nitrous oxide supply bottle and the supplemental fuel pump prevents backfiring.

Figure 2:
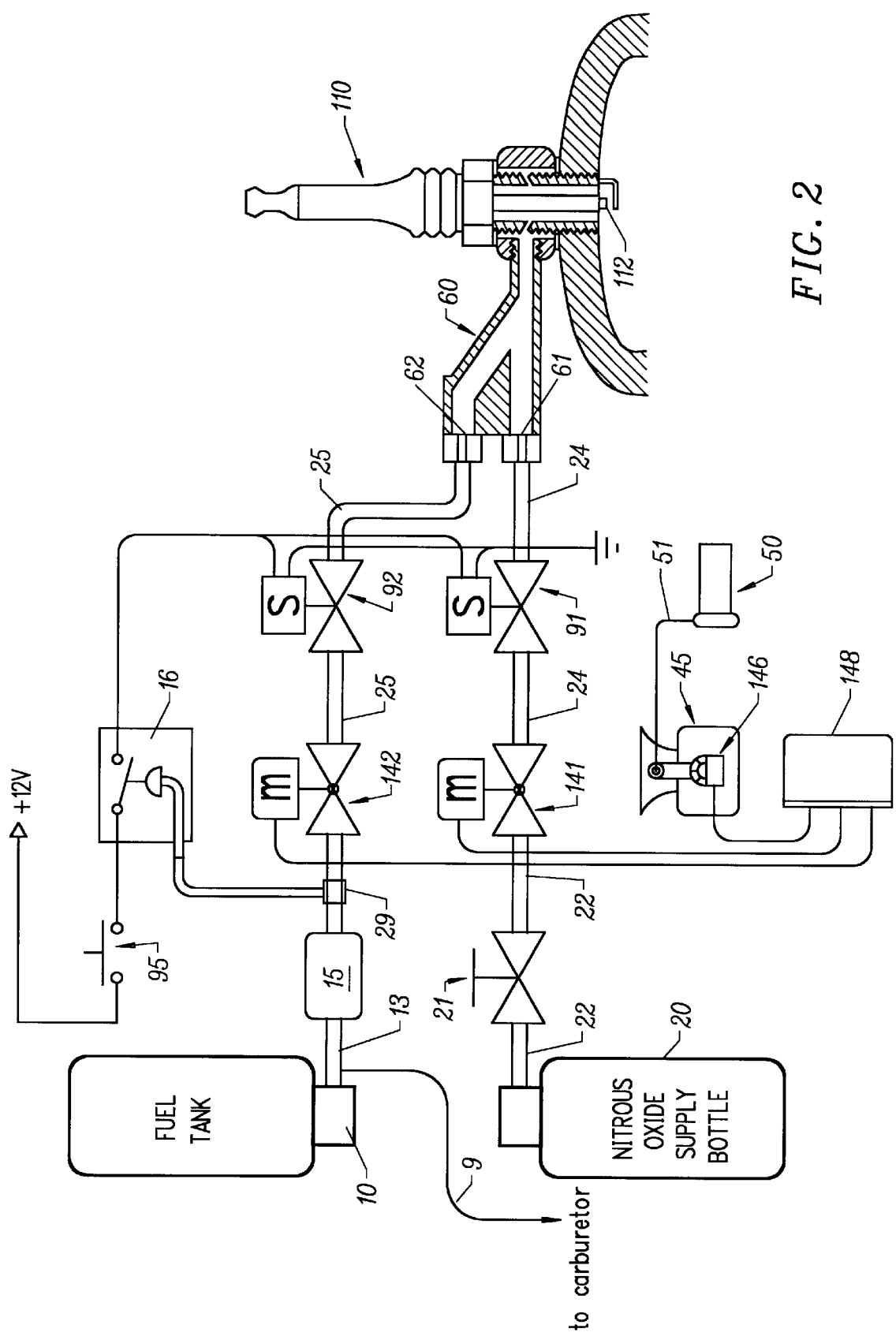
FIG. 2 is a schematic representation of a second embodiment of the invention wherein the supplemental nitrous oxide and fuel metering valves are controlled electronically.

FIG. 2 shows an alternate embodiment of the invention. The existing fuel line 9 passes through the existing fuel pump (not shown in FIG. 2 for clarity) to the carburetor and through intake valves (not shown). Instead of the mechanical linkage 43 shown in FIG. 1, the supplemental nitrous oxide and fuel flow control valves 141 and 142 (or metering means), respectively, are electrically controlled from an Electronic Control Unit (ECU) 148. A Throttle Position Sensor (TPS) 146 is mounted on the throttle shaft on the existing carburetor/throttle body 45 to monitor its position. The ECU 148 uses the throttle position sensor 146 signal (022 100%) as an input to proportionally open the flow control valves (or metering means) 141 and 142.

The nitrous oxide and fuel flow control valves 141 and 142, respectively, in FIG. may each be a high speed injector solenoid design that receives pulse width modulated signals from the ECU 148 to vary their desired flow rate, or an electromechanical design where their flow rate is determined by a variable direct current (DC) control signal from the ECU 148. The flow rates may be directly proportional to the throttle position sensor 46 signal, or any one of several different profiles that can be programmed into the ECU 148. In all other respects, the embodiments shown in FIGS. 1 and 2 are the same.

Figure 3:
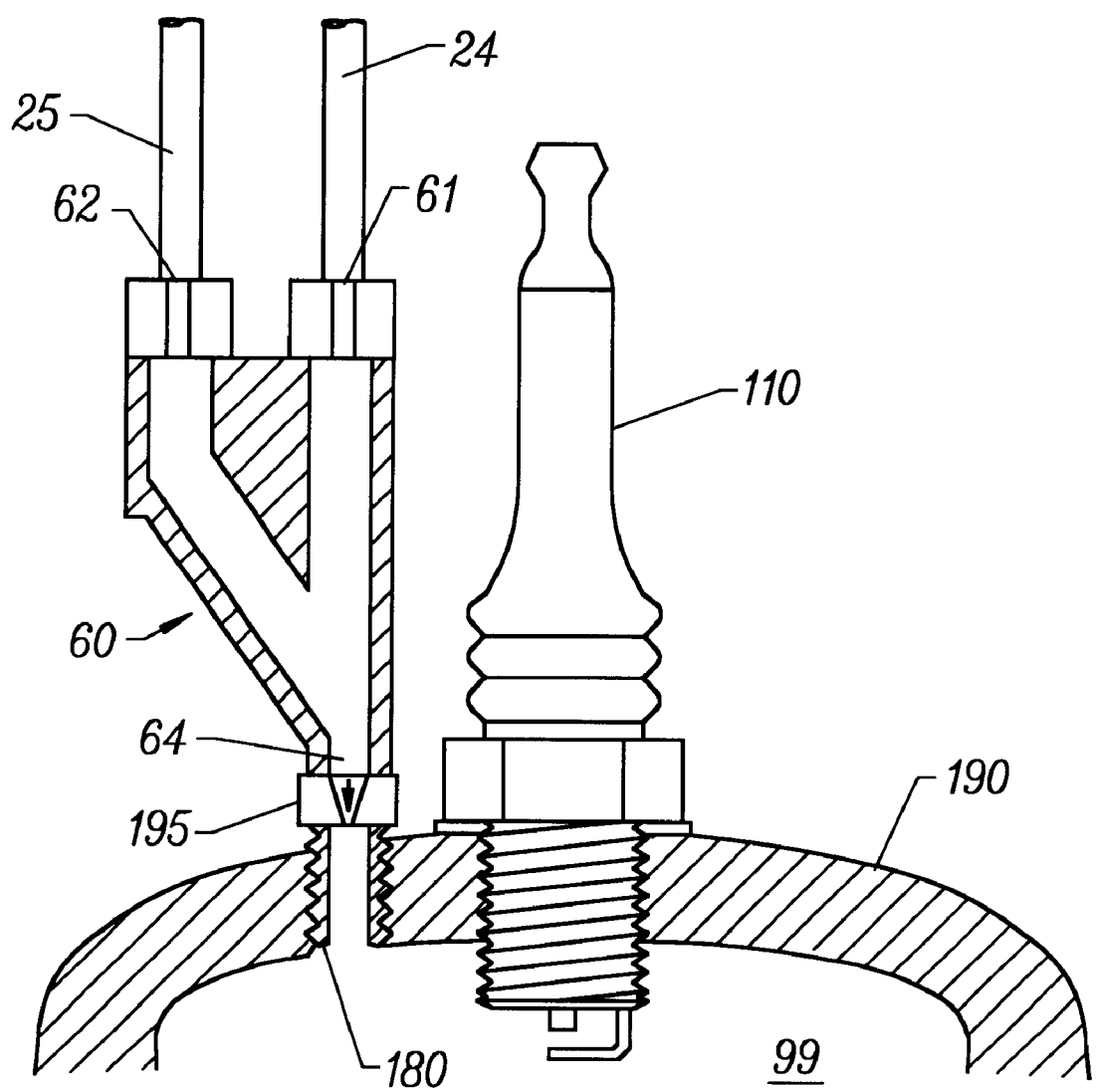
FIG. 3 is a sectional view illustrating a second method of direct cylinder injection with a second passageway formed in the cylinder head for entry of the supplemental nitrous oxide and fuel mixture directly into the combustion chamber.

FIG. 3 shows another form of the invention in which the fogger outlet 64 is connected directly to a second passageway 180 through the engine head 120 so that the combined nitrous oxide and gasoline or other fuel enters combustion chamber 99 through a second threaded opening 180 in engine head 190. A one way valve 195 is included in foggier assembly 60 to prevent backflow of pressure and/or backflow of flame front.

Figure 4:
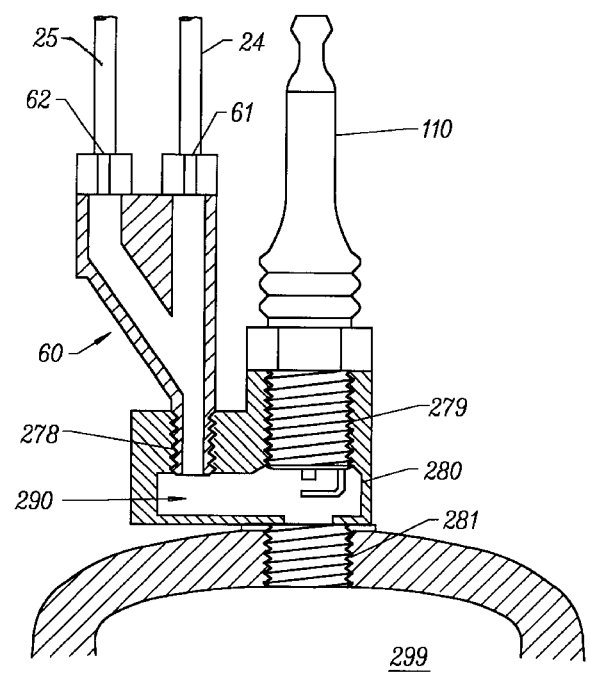
FIG. 4 illustrates yet another embodiment wherein a secondary, or precombustion, chamber is provided to introduce the supplemental nitrous oxide and fuel mixture to the spark plug.

FIG. 4 shows a third alternate apparatus for delivering the fuel and nitrous oxide mixture. The fogger assembly 60 and the spark plug 110 are threaded into and carried by recesses 278 and 279 formed in a support block or Spark Plug Injection Adapter (SPIA, design #2) 280. SPIA#2 280 has a threaded, male extension 281 that threads into the standard spark plug opening formed in the cylinder head. SPIA#2 280 forms a secondary, precombustion chamber 290 adjacent combustion chamber 299.

Figure 5:
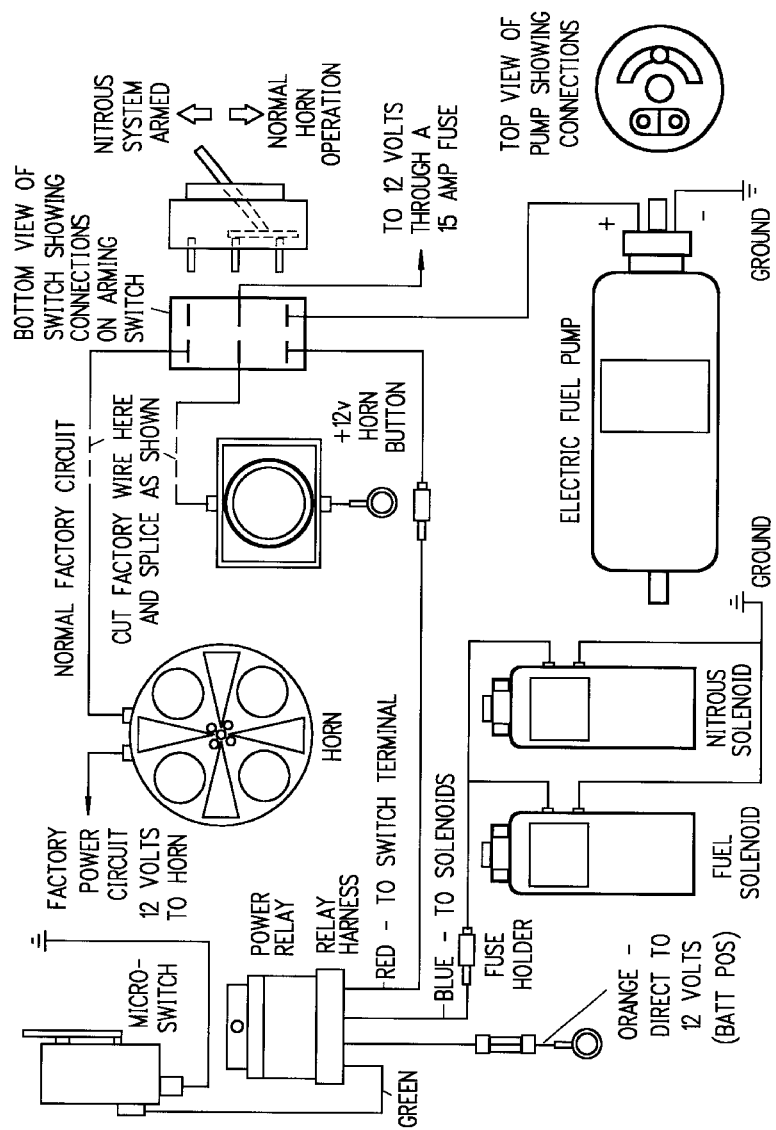
FIG. 5 illustrates a prior art system wherein the nitrous oxide is introduced only after about 50% of wide open throttle has been achieved.

FIG. 5 illustrates a prior art system described briefly at page 1 above.

Changes may be made in the specific embodiments shown in the drawings without departing from the invention. The invention is described in the claims.

What is claimed is:

1. A supplemental nitrous oxide and fuel injection system for use with an internal combustion engine, wherein said internal combustion engine has an existing primary fuel supply and wherein said primary fuel is delivered to said engine under throttle control, said supplemental nitrous oxide injection system comprising:

a reservoir of nitrous oxide, supplemental nitrous oxide supply means extending from said reservoir into a separate fogger means for each cylinder, wherein each of said fogger means is positioned adjacent a cylinder, and then directly from a fogger means into each cylinder of said engine without passing through an intake manifold or carburetor, supplemental fuel supply means for providing fuel into each of said separate fogger means for each cylinder to combine with said nitrous oxide, and supplemental nitrous oxide and supplemental fuel metering means for controlling the flow of supplemental nitrous oxide and fuel into each fogger means for each cylinder of said engine, said flow of supplemental nitrous oxide and fuel being regulated in a predetermined relationship to the flow of said primary fuel being regulated over the entire operating throttle range of said engine.

2. The apparatus of claim 1 wherein said supplemental nitrous oxide and supplemental fuel metering means are connected to said throttle control and wherein said supplemental nitrous oxide and supplemental fuel are supplied to said engine in direct proportion to the throttle control supplying primary fuel to said engine.

3. The apparatus of claim 1 wherein the method of determining the flow-rate of said supplemental nitrous oxide and fuel through said supplemental nitrous oxide and fuel metering means at any point in time is a linkage to, and is proportional with, the existing throttle control of said internal combustion engine.

4. The apparatus of claim 1 wherein said supplemental nitrous oxide and fuel metering means are comprised of two electrically-actuated, variable-flow, metering valves for the supplemental nitrous oxide and fuel, respectively, and said two electrically-actuated, variable-flow metering valves are controlled from an electronic control unit, and said electronic control unit determines the desired flow-control rate by measuring the position of the existing throttle with a throttle-position sensor and setting the flow-control rate (0–100%) to be proportional to the throttle position (0–100%).

5. The apparatus of claim 1 wherein said direct cylinder injection is accomplished by a spark plug injection adapter that distributes the mixed nitrous oxide/fuel from the mixer nozzle output through an annulus space next to the outer threads of the spark plug(s), and said mixed nitrous oxide/fuel is then routed from the external threads of the spark plug(s) through holes or passageways in the spark plug's threaded region to the inner side of the spark plug(s) near the firing tip located in the cylinder of said internal combustion engine.

6. The apparatus of claim 1 wherein said direct cylinder injection method is accomplished by threading an extension of the mixer nozzle directly through a thread port or passageway in the combustion chamber of said internal combustion engine near the threaded hole for the spark plug(s).

7. The apparatus of claim 1 wherein said direct cylinder injection method is accomplished by a different spark plug injection adapter that is formed by a support block that threads into the spark plug hole of the combustion chamber (s), and said support block also comprises two threaded openings for accepting the spark plug and a threaded extension of said mixer nozzle, forming a secondary, precombustion chamber adjacent to the existing combustion chamber of said engine.

8. The apparatus of claim 1 further comprising an on demand on-off switch for said supplemental nitrous oxide and fuel wherein said system supplies supplemental nitrous oxide and fuel to said engine only when said switch is in the on position.

* * * * *

UNITED STATES PATENT AND TRADEMARK OFFICE
CERTIFICATE OF CORRECTION

PATENT NO. : 6,260,546 B1  
DATED : July 17, 2001  
INVENTOR(S) : E. Lanny Vaughn Page 1 of 1

It is certified that error appears in the above-identified patent and that said Letters Patent is hereby corrected as shown below:

Title page,
Change the title of the invention to -- DIRECT NITROUS OXIDE INJECTION SYSTEM OPERABLE FROM ZERO TO 100% THROTTLE CONTROL --

Column 3,
Line 55, change "(022 100%)" to -- (0-100%) --
Line 58, after the word "FIG." insert -- 2 --.

Claims,
Delete claim 6.

Signed and Sealed this

Second Day of April, 2002

Attest:

Attesting Officer

JAMES E. ROGAN
Director of the United States Patent and Trademark Office